Dec. 25, 1962 — W. A. LEDWITH ETAL — 3,069,850
ROCKET NOZZLE WITH DIRECTIONAL CONTROL
Filed May 18, 1959

INVENTORS
PHILIP P. NEWCOMB
WALTER A. LEDWITH
BY Charles A. Warren
ATTORNEY

3,069,850
ROCKET NOZZLE WITH DIRECTIONAL CONTROL
Walter A. Ledwith, Glastonbury, and Philip P. Newcomb, Manchester, Conn., assignors to United Aircraft Corporation, East Hartford, Conn., a corporation of Delaware
Filed May 18, 1959, Ser. No. 813,801
6 Claims. (Cl. 60—35.54)

This invention relates to a nozzle arrangement and particularly to a directionally controlled nozzle for a rocket.

One feature of the invention is the use in conjunction with a main nozzle of a plurality of angularly directed small nozzles by which to control the direction of the main nozzle and the device associated therewith. Another feature is the use of the propellant fluid for the small nozzles as a coolant for the main nozzle. Another feature is the independent control of the supply of propellant to each of the small nozzles.

One feature of the invention is a manifold located adjacent to the trailing edge of the main nozzle from which the plurality of directional nozzles may be supplied selectively with propellant. Another feature is the supply of propellant to the manifold through coolant passages in the wall of the main nozzle thereby heating the propellant before it reaches the manifold and serving also to cool the nozzle.

Other features and advantages will be apparent from the specification and claims, and from the accompanying drawing which illustrates an embodiment of the invention.

Figure 1:
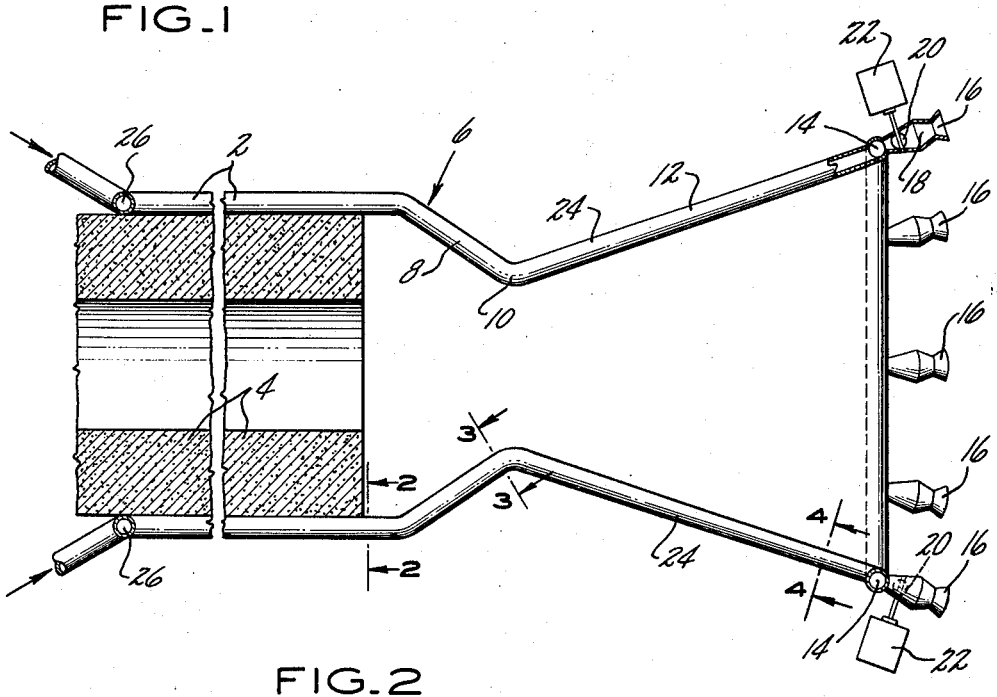
FIG. 1 is a longitudinal sectional view through the nozzle construction.
Figure 2:
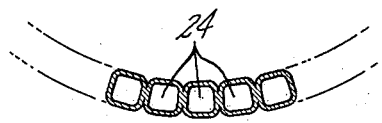
FIG. 2 is a fragmentary transverse sectional view substantially along the line 2—2 of FIG. 1.

The invention is shown in conjunction with a solid fuel rocket in which the combustion chamber 2 having a solid propellant 4 therein has a nozzle 6 connected thereto for the discharge of the products of combustion resulting from the burning of the solid propellant. The nozzle has a convergent portion 8, a throat 10 and a divergent position 12, the latter having at its downstream end a ring manifold 14. This manifold carries a plurality of small discharge nozzles 16, each of which extends at the same acute angle to the axis of the nozzle and each of which is supplied with propellant from the manifold 14. Although the device is shown in conjunction with a solid fuel rocket, it will be understood that it is equally applicable to a liquid rocket in which event the same propellant may be used for the main rocket nozzle and the auxiliary nozzles.

Between the manifold 14 and the nozzle 16 is a combustion chamber 18 for each of the small nozzles and the admission of propellant to each combustion chamber 18 is controlled by a valve 20, the position of which is determined by a suitable control mechanism 22. It will be understood that all of the nozzles 16 may be normally in operation by having all of the valves 20 open. If the nozzles 16 are arranged uniformally around the manifold the directional thrusts of the nozzle will be balanced and there will be no change in the direction of the rocket by reason of the discharge from these nozzles. However, for the purpose of changing the direction of the rocket the appropriate valves 20 may be partially closed thereby reducing the thrust provided by one or more of the nozzles 16. This will produce an unbalanced transverse thrust which will cause a change in the direction of the rocket.

Figure 3:
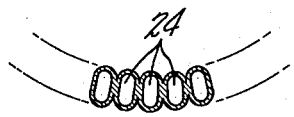
FIG. 3 is a fragmentary sectional view substantially along the line 3—3 of FIG. 1.
Figure 4:
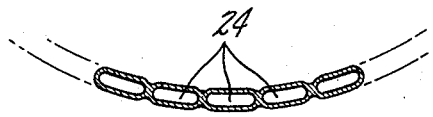
FIG. 4 is a fragmentary sectional view substantially along line 4—4 of FIG. 1.

The supply of propellant to the manifold 14 may be through the tubes 24 that form the wall of the combustion chamber and the nozzles. As shown, the combustion chamber wall and the nozzle may be made up of a ring of tubes 24 arranged in side-by-side relation and brazed or otherwise permanently secured together. In order to accommodate these tubes to the different diameters of the chamber and nozzle the tubes may be flattened in a circumferential direction, as shown in FIG. 3, to form the throat for the nozzle and may be flattened radially, as shown in FIG. 4, to form the large-diameter downstream end of the nozzle. In between these two extremes the tube goes from radially flattened to circumferentially flattened depending upon the diameter of the nozzle at the particular axial location. It will be understood that in any event each tube occupies the same segment of the complete circumference at any position axially of the rocket.

All of the tubes communicate with the manifold 14 for the delivery of propellant to this manifold. The propellant may be delivered to the tubes at or adjacent their upstream ends as by means of another manifold 26 with which all of the tubes communicate. With the propellant flowing through all of the tubes 24 it will be apparent that the walls of the chamber and the nozzle may be effectively cooled by the propellant and in turn the propellant will be heated to such an extent that its decomposition or combustion in the combustion chambers 18 will readily take place.

It is to be understood that the invention is not limited to the specific embodiment herein illustrated and described, but may be used in other ways without departure from its spirit as defined by the following claims.

We claim:

1. A thrust nozzle arrangement including a main nozzle having a throat and a divergent portion with a trailing edge, in combination with a ring of small circumferentially spaced nozzles located adjacent to said trailing edge and externally of the main nozzle, each containing a combustion chamber and each directed rearwardly and outwardly at substantially the same acute angle to the axis of the main nozzle, means for supplying a propellant fluid to said small nozzles including a manifold in the trailing edge of the main nozzle to which each of the small nozzles is connected, and means interposed between said manifold and each of said small nozzles for selectively controlling the supply of propellant fluid to each of said small nozzles for directional control.

2. A thrust nozzle arrangement as in claim 1 in which said interposed means is valve means.

3. A thrust nozzle arrangement as in claim 1 in which the propellant fluid for the small nozzles is supplied through coolant passages in the wall of the main nozzle communicating with the manifold.

4. In combination, a thrust nozzle, a manifold attached to the trailing edge of said thrust nozzle, a plurality of small nozzles attached to and in flow communication with said manifold, each of said small nozzles being at substantially the same acute angle to the axis of said thrust nozzle, means including cooling passages in the wall of said thrust nozzle connected to said manifold for continuously delivering propellant to said manifold and means for selectively controlling the supply of propellant from said manifold to each of said nozzles for directional control.

5. A thrust nozzle arrangement including a main nozzle having a throat and a divergent portion with a trailing edge, in combination with a ring of small circumferentially spaced nozzles located adjacent to said trailing edge and externally of the main nozzle and each arranged at substantially the same acute angle to the axis of the main nozzle, means for supplying a propellant fluid to said small nozzles including a manifold in the trailing edge of the main nozzle to which each of the small nozzles is connected, and means for selectively controlling the supply of propellant fluid to each of said small nozzles for directional control, said main nozzle having a plurality of cooling passages axially thereof communicating with the manifold at their downstreams ends, and valve connections from the manifold to each of the several small nozzles.

6. A thrust nozzle arrangement including a main nozzle having a convergent portion, a throat and a divergent portion, a plurality of axially extending tubes forming the wall of said main nozzle, each of said tubes being in contact with the adjacent tube throughout its length and each tube being flattened in order to accommodate the tubes to the varying diameter of the main nozzle, all of said tubes terminating in a manifold at the downstream end, a plurality of small circumferentially spaced thrust nozzles attached to and in communication with said manifold, said small thrust nozzles being supplied with a propellant from said tubes and said manifold, each of said small thrust nozzles being arranged at substantially the same acute angle to the axis of the main nozzle, and means for selectively controlling the supply of propellant from said manifold to each of said small thrust nozzles for directional control.

References Cited in the file of this patent

UNITED STATES PATENTS

| | | |
|---|---|---|
| 2,726,510 | Goddard | Dec. 13, 1955 |
| 2,728,191 | Casey | Dec. 27, 1955 |
| 2,841,955 | McLafferty | July 8, 1958 |
| 2,880,577 | Halford et al. | Apr. 7, 1959 |

FOREIGN PATENTS

| | | |
|---|---|---|
| 879,835 | France | Dec. 10, 1942 |
| 64,773 | France | June 29, 1955 |
| | (Addition) | |
| 1,130,132 | France | Sept. 17, 1956 |
| 610,143 | Great Britain | Oct. 12, 1948 |
| 696,751 | Great Britain | Sept. 9, 1953 |
| 809,844 | Great Britain | Mar. 4, 1959 |

OTHER REFERENCES

Chandler: "Anti-Bomber Rocket Missiles," Aero Digest, vol. 60, No. 4, pages 100–101, April 1950.

Aviation Age Magazine (now known as Space Aeronautics), "Propulsion," vol. 28, No. 5, November 1957, pages 59–66.